(12) United States Patent
Gopisetty et al.

(10) Patent No.: US 10,277,503 B2
(45) Date of Patent: *Apr. 30, 2019

(54) CROSS-DOMAIN SERVICE REQUEST PLACEMENT IN A SOFTWARE DEFINED ENVIRONMENT (SDE)

(71) Applicant: International Business Machines Corporation, Armonk, NY (US)

(72) Inventors: Sandeep Gopisetty, Morgan Hill, CA (US); Ramani R. Routray, San Jose, CA (US); Yang Song, San Jose, CA (US); Chung-Hao Tan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,248

(22) Filed: Nov. 27, 2017

(65) Prior Publication Data
US 2018/0077056 A1    Mar. 15, 2018

Related U.S. Application Data

(63) Continuation of application No. 14/587,094, filed on Dec. 31, 2014, now Pat. No. 9,876,713.

(51) Int. Cl.
*G06F 15/173* (2006.01)
*H04L 12/717* (2013.01)
*G06F 9/455* (2018.01)
(Continued)

(52) U.S. Cl.
CPC .......... *H04L 45/42* (2013.01); *G06F 9/45533* (2013.01); *G06F 9/45558* (2013.01);
(Continued)

(58) Field of Classification Search
CPC ....... H04L 45/42; H04L 45/04; H04L 45/124; H04L 45/308; H04L 47/2425;
(Continued)

(56) References Cited

U.S. PATENT DOCUMENTS 8,392,461 B2 *  3/2013  Brown .............. G06F 17/30306
                                                         707/786
9,591,018 B1 *  3/2017  Zakian .................. G06F 21/552
(Continued)

FOREIGN PATENT DOCUMENTS

WO         2014039772 A1      3/2014

OTHER PUBLICATIONS

Gopisetty et al., "Cross-Domain Service Request Placement in a Software Defined Environment (SDE)", U.S. Appl. No. 14/587,094, filed Dec. 31, 2014.
(Continued)

*Primary Examiner* — Sm A Rahman
(74) *Attorney, Agent, or Firm* — Cantor Colburn LLP; Abdy Raissinia (57) ABSTRACT

Embodiments relate to cross-domain service request placement in a software defined environment (SDE). An aspect includes receiving a service request corresponding to a job to be completed in the SDE. Another aspect includes determining a first computer device in a first domain, and a second computer device in a second domain, that are capable of performing the service request. Another aspect includes determining, for the first and second computer devices, first and second pluralities of available service classes. Another aspect includes determining, for the first and second computer devices, a first and second plurality of costs of performing the service request, wherein each of the first and second plurality of costs corresponds to a single respective service class. Yet another aspect includes selecting one of
(Continued)

the first computer device and the second computer device to perform the service request based on the first and second plurality of costs.

19 Claims, 4 Drawing Sheets

(51) Int. Cl.
*H04L 12/721* (2013.01)
*H04L 12/725* (2013.01)
*H04L 12/715* (2013.01)
*H04L 12/851* (2013.01)

(52) U.S. Cl.
CPC .... *G06F 2009/45595* (2013.01); *H04L 45/04* (2013.01); *H04L 45/124* (2013.01); *H04L 45/308* (2013.01); *H04L 47/2425* (2013.01)

(58) Field of Classification Search
CPC ............. G06F 9/45533; G06F 9/45558; G06F 2009/45595
USPC ........................................................ 709/238
See application file for complete search history.

(56) References Cited

U.S. PATENT DOCUMENTS

| | | | |
|---|---|---|---|
| 2014/0282586 A1* | 9/2014 | Shear | .................... G06F 9/5072 718/104 |
| 2015/0220354 A1* | 8/2015 | Nair | ........................ G06F 13/28 710/301 |
| 2017/0264488 A1 | 9/2017 | Ami et al. | |
| 2018/0241643 A1 | 8/2018 | Chaganti et al. | |

OTHER PUBLICATIONS

List of IBM Patents or Patent Applications Treated as Related; Date Filed: Nov. 28, 2017, 2 pages.

* cited by examiner

CROSS-DOMAIN SERVICE REQUEST PLACEMENT IN A SOFTWARE DEFINED ENVIRONMENT (SDE)

CROSS-REFERENCE TO RELATED APPLICATION

This application is a continuation of U.S. application Ser. No. 14/587,094, filed Dec. 31, 2014, the contents of which are hereby incorporated by reference in its entirety.

BACKGROUND

The present invention relates generally to data centers, and more specifically, to cross-domain service request placement in a data center comprising a software defined environment (SDE).

A data center comprises a plurality of interconnected computer systems. The computer systems may comprise computer systems that are configured for computation functions, such as hypervisor computer systems; computer systems that are configured for networking functions, such as computer systems that are configured to act as switches or routers, and computer systems that are configured for storage functions, such as servers comprising computer disk storage with associated storage controllers. The networking domain computer systems are used to connect virtual machines hosted by the computation domain computer systems to one another, and to the storage domain computer systems.

SUMMARY

Embodiments include a method, system, and computer program product for cross-domain service request placement in a software defined environment (SDE). An aspect includes receiving, by a cross-domain service request placement module in an SDE controller, a service request corresponding to a job to be completed in the SDE, the SDE comprising a plurality of domains, each of the plurality of domains comprising a respective plurality of computer devices. Another aspect includes determining, by the cross-domain service request placement module, a first computer device in a first domain of the plurality of domains, and a second computer device in a second domain of the plurality of domains, that are capable of performing the service request. Another aspect includes determining, for the first computer device, a first plurality of available service classes, wherein the first plurality of available service classes is specific to the first domain. Another aspect includes determining, for the first computer device, a first plurality of costs of performing the service request, wherein each of the first plurality of costs corresponds to a single respective service class of the first plurality of service classes. Another aspect includes determining, for the second computer device, a second plurality of available service classes, wherein the second plurality of available service classes is specific to the second domain. Another aspect includes determining, for the second computer device, a second plurality of costs of performing the service request, wherein each of the second plurality of costs corresponds to a single respective service class of the second plurality of service classes. Yet another aspect includes selecting one of the first computer device and the second computer device to perform the service request based on the first and second plurality of costs.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of cross-domain service request placement are provided, with exemplary embodiments being discussed below in detail. An SDE comprises a data center comprising multiple management and operation domains, i.e., a computation domain, a networking domain, and a storage domain. In a traditional data center, these domains are usually are managed separately and independently, and only one type of functionality or service operation can be executed on the devices in a specific domain. In an SDE, the various computer systems in the various domains may be controlled together for integrated cross-domain management. An SDE controller is in communication with each of the domains, and may distribute a service request for completion by any computer system in any domain, so as to make use of the computing resources available in each domain. The SDE controller includes a service request placement module that determines the cost of performing a service request by each available computer system in each domain, and selects a computer system of the available computer systems to perform the request based on the determined costs. The costs may be computed based on a plurality services classes that are separately defined for each domain, and based on historical and projected load data for the devices in each domain.

A service request may be any appropriate type of job that may be executed on a computer device. For example, a client or an application, which may be hosted on a virtual machine (VM) of the SDE in some embodiments, may issue a service request to the SDE controller comprising a compression request specifying multiple data blocks that need to be written to the backend storage system in a compressed form. To fulfill this service request, the data blocks generated by the VM must be compressed before being stored at the backend disk. The compression operation may be performed at multiple places along the I/O path, e.g., at the computation domain (e.g., at a hypervisor), at the storage domain (e.g., at a storage controller), or at the networking domain (e.g., at a computer device comprising a switch or router), because the devices in each of the domains have processing resources that are capable of performing compression of data. From the requestor's perspective, the quality of service depends not only on the domain that performs the service request, but also on the aggregate load (e.g., storage input/output (I/O), network traffic, central processing unit (CPU) load) on the selected device, as well as the service class of the service request, which determines the service request's priority of the resources on the device. The service-class-to-resource mapping may vary among different domains. For example, a device in the computation domain (e.g., a hypervisor or server) may reserve certain CPU cycles for the top service class tasks (e.g., platinum), whereas a device in the storage domain (e.g., a storage controller) may allocate all resources to serve tasks with higher priorities first before serving tasks with lower level priorities. Both service-class-to-resource mapping relationship can be configured by the administrator of the SDE via configurable policies. Therefore, from the SDE controller's perspective, upon the arrival of a new service request, the device and service class for the service request may be selected in a joint fashion.

The device and service class selection is made dynamically in accordance to the SDE environment changes. For example, if the networking domain is currently being overwhelmed by excessive network traffic with high priority, selection of a device in the networking domain should be avoided to serve the compression request due to the limited resource on networking devices.

In the SDE, the priority of each service request, as given by it service class, may be controlled and adjusted. In addition, different domains may have different domain-specific mappings between the overall resource demands and the quality of service experienced by a new service request. For example, for a particular service request, the goal may be to minimize processing delay in completing the service request (e.g., minimize the time to finish the compression job). In an example, both of the computation and storage domains can perform the service request. If the computation domain is selected to fulfill the service request, the experienced latency will be affected by the aggregate load of the computation domain, e.g., all computational jobs that the CPU will execute, as well as the service classes of each of the computational jobs. If there are many gold level jobs running on the computation devices, the service request will have limited resource share even if its service class is elevated to gold, because the service request is sharing the CPU cycles with all other gold-class jobs on the computation domain device. In contrast, if there are relatively few gold and silver level I/O activities at the storage controller in the storage domain, selecting the silver service class in the storage domain to serve the service request may yield better performance as compared to the gold service class in the computation domain, as the service request will be able to utilize a relatively large portion of the CPU resources of the storage controller.

Figure 1:
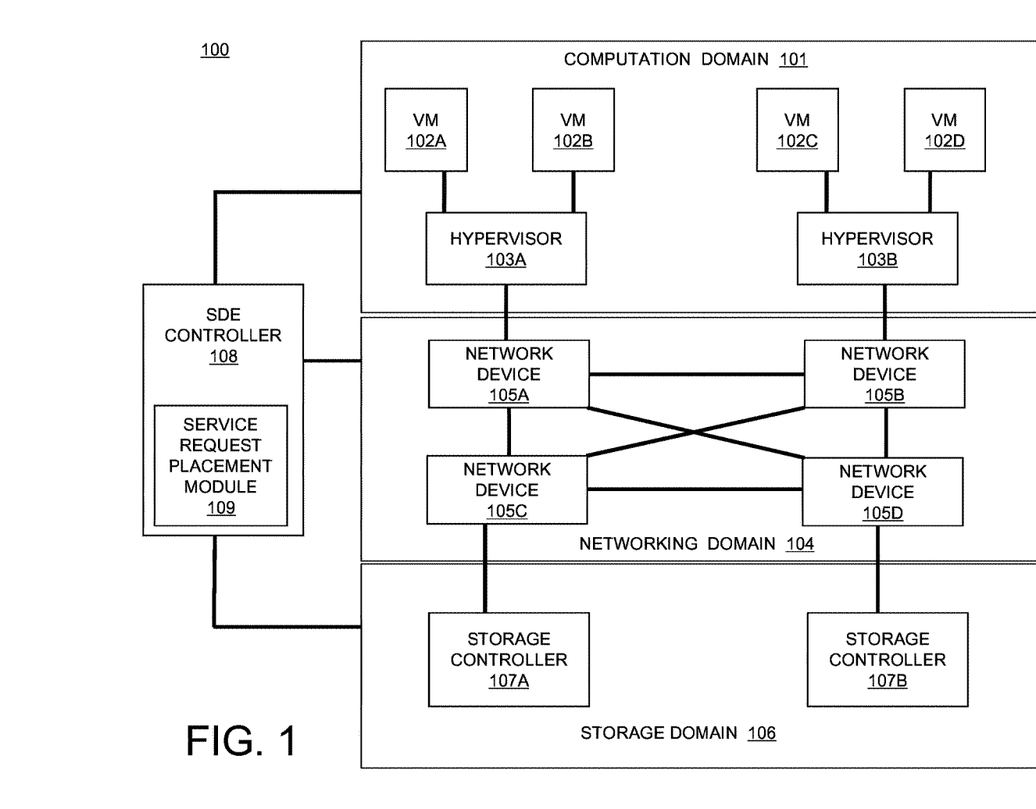
FIG. 1 depicts a software defined environment (SDE) including a cross-domain service request placement module in accordance with an embodiment.

FIG. 1 illustrates an embodiment of a SDE system 100. SDE system 100 includes a computation domain 101, which comprises a plurality of computer systems that comprise hypervisors 103A-B. Each of hypervisors 103A-B hosts one or more of virtual machines (VMs) 102A-D. Computation domain 101 is in communication with the networking domain 104, which is made up of a plurality of interconnected computer devices that comprise networking devices 105A-D. Networking devices 105A-D may comprise, for example, switches or routers. Networking domain 104 connects computation domain 101 to the storage domain 106, which comprises a plurality of computer storage systems that include one or more storage controllers such as storage controllers 107A-B. Each of hypervisor 103A-B, networking devices 105A-D, and storage controllers 107A-B comprise computer systems that have processing resources for servicing of requests. The SDE controller 108 is in communication with each of the computation domain 101, the networking domain 104, and storage domain 106, and may distribute service requests to any computer system in any of the computation domain 101, the networking domain 104, and storage domain 106. The service request placement module 109 in SDE controller 108 is configured to select a computer system in one of the domains to handle each service request received by the SDE controller. The service requests may be generated by, for example, VMs 102A-D and communicated to SDE controller 108. FIG. 1 is shown for illustrative purposes only; each of the computation domain, networking domain, and storage domain may include any appropriate number of computer systems or devices, and the computer systems or devices in each domain and across the domains may be interconnected in any appropriate manner.

Figure 2:
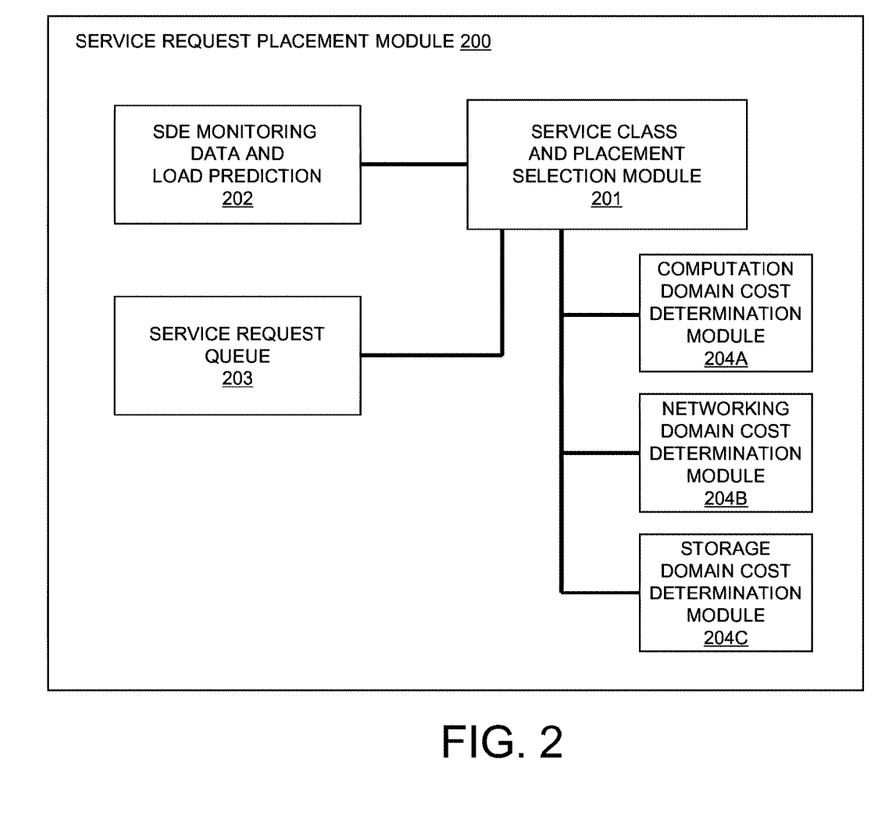
FIG. 2 depicts a cross-domain service request placement module in accordance with an embodiment.

FIG. 2 illustrates an embodiment of a service request placement module 200. Service request placement module 200 may comprise service request placement module 109 of FIG. 1. Service request placement module 200 includes a service request queue, which may hold one or more service requests that require servicing in the SDE system 100. The service requests may be generated by, for example, VMs 102A-D. SDE monitoring data and load prediction module 202 holds historical load data for each of the computer systems or devices in each of the domains that make up the SDE 100; the historical load data may be collected by SDE controller 108 during operation of the SDE 100. The SDE monitoring data and load prediction module 202 may predict future load conditions for any computer system or device in the SDE 100 based on the collected historical data. Service class and placement selection module 201 determines, for each service request, a computer system within one of the domains to perform the service request. The request service class and placement selection module 201 also determines a service class for each service request. The service class and placement selection module 201 is in communication with a plurality of cost determination modules 204A-C that are used to select the computer system and service class for each service request. The computation domain cost determination module 204A determines the service classes available for a service request in the computation domain 101, and the cost for performing a service request in each of the service classes on each available computer system (for example, any of hypervisors 103A-B) in the computation domain 101. The networking domain cost determination module 204B determines the service classes available for a service request in the networking domain 104, and the cost for performing a service request in each of the service classes on each available computer system (for example, any of networking devices 105A-D) in the networking domain 104. The storage domain cost determination module 204C determines the service classes available for a service request in the storage domain 106, and the cost for performing a service request in each of the service classes on each available computer system (for example, any of storage controllers 107A-B) in the storage domain 106. The determined costs are provided from the cost determination modules 204A-C to the service class and placement selection module 201.

Figure 3:
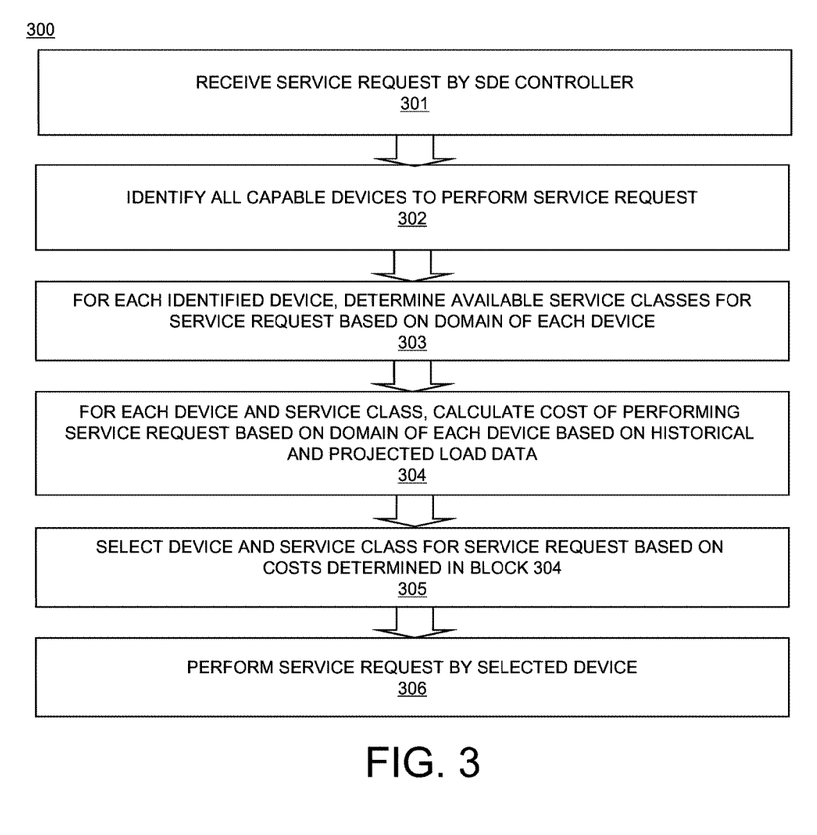
FIG. 3 depicts a process flow for cross-domain service request placement in accordance with an embodiment.

FIG. 3 illustrates an embodiment of a method 300 for cross-domain service request placement. Method 300 may be implemented in service request placement module 109/ 200. First, in block 301, a service request is received by the SDE controller 108. The service request may be generated by, for example, one of VMs 102A-D, and may be placed into service request queue 203 for placement by service class and placement selection module 201. A service request may be any appropriate type of service request, for example, a data compression job. A service request may specify a minimum service level required to perform the service request. Next, in block 302, the service class and placement selection module 201 begins processing the service request by identifying all feasible, or capable, computer devices in SDE system 100 that can perform the service request. The identification may performed based on the specified minimum service level of the service request, the type of job corresponding to the service request, and the capabilities and characteristics of the devices (for example, whether a device is a trusted device, or whether a device has a built-in compression engine) in the SDE 100. The identified devices may be any of hypervisors 103A-B, networking devices 105A-D, or storage controllers 107A-B that have sufficient processing resources available to perform the service request.

Next, in block 303, the service class and placement selection module 201 determines, for each of the devices that were identified in block 302, the service classes that are available for the service request. Each domain may have differently defined service classes. For example, for devices in the computation domain 101, available service classes may include platinum, gold, silver, and bronze, while, for devices in the storage domain 106, available service classes may include gold, silver and bronze. Further, the gold service class in the computation domain may have different specifications that the gold service class in the storage domain. Flow then proceeds to block 304, in which the cost for performing the service request for each identified device/service class pair is determined in one or more of cost determination modules 204A-C according to a cost function. The cost function may vary based on the job type associated with the service request, and may comprise, for example, minimization of a metric such as delay time. The costs may be determined based on the current load on each of the identified devices, and on historical and predicted load data from SDE monitoring data and load prediction module 202. Then, in block 305, a device/service class pair is selected for the service request based on the costs that were determined in block 304. The device/service class pair may be selected based on a predetermined cost function. Lastly, in block 306, the service request is performed by the selected device as specified by the selected service class.

In an example of execution of method 300, in block 301, VM 102A initiates a service request comprising compressing multiple blocks of data before writing the compressed data to a backend storage device in the networking domain 104. The SDE controller 108 receives the service request corresponding to the compression job. Next, in block 302, all possible places, i.e., devices, in SDE system 100 which are capable of fulfilling this service request are identified as candidate locations. In this example, the service request placement module 109/200 determines that the compression of the data blocks can be performed by the hypervisor 103A where VM 102A is located in the computation domain 101, or by the storage controller 107A connected to the backend disk in the storage domain 106. Both hypervisor 103A and storage controller 107A are therefore identified as candidate locations that can service the request for compression of the data blocks, e.g., via real-time compression functionality that is implemented in both hypervisor 103A and storage controller 107A. Depending on each service request's specific service level requirements and job characteristics, the set of candidate locations can vary. For example, if the request has a specific security requirement that specifies that the service request can only be performed at devices having certain characteristics, e.g., trusted devices with strong authentication, the identified candidate locations will exclude devices with weak security credentials.

Next, in block 303, for each device that was identified in block 302 (i.e., hypervisor 103A and storage controller 107A), all available service, or priority, classes are identified by service request placement module 109/200. This determination is made based on the domain of each device. In this example, for hypervisor 103A, the computation domain 101 has 4 service classes, i.e., platinum, gold, silver, and bronze, while the storage domain 106 has 3 service classes, i.e., gold, silver, and bronze. An extended candidate location list can therefore be constructed as follows: Hypervisor103A@Compute&Platinum; Hypervisor103A@Compute&Gold; Hypervisor103A@Compute&Silver; Hypervisor103A@Compute&Bronze; StorageController107A@Storage@Gold; StorageController107A@Storage@Silver; and StorageController107A@Storage@Bronze.

Next, in block 304, for each device/service class pair in the extended candidate location list, the service request placement module 109/200 calculates the cost associated with performing the service request using the device/service class pair according a predetermined cost function. For example, if the cost function is the delay of performing the compression, the cost determination modules 204A and 204C in service request placement module 109/200 will calculate an estimation of the processing delay (i.e., how long to finish the compression job) for the entries in the extended list. Note that any appropriate cost function may be used in various embodiments, such as the business value of completion of the request, the criticality of the request, and/or energy consumption of the SDE system 100.

In block 304, the computation domain cost determination module 204A calculates of performing the service request for each device/service class pair in the computation domain 101, i.e., Hypervisor103A@Compute&Platinum; Hypervisor103A@Compute&Gold; Hypervisor103A@Compute&Silver; Hypervisor103A@Compute&Bronze, wherein the cost is an estimation of an amount of delay in performing the compression. In this example, in the computation domain 101, a central processing unit (CPU) resource allocation policy specifies that the CPU resources allocated for a bronze level job are half (½) the CPU resources allocated for a silver level job, one-third (⅓) of the CPU resources allocated for gold level job, and one-fourth (¼) of the CPU resources allocated for a platinum level job. The computation domain cost determination module 204A determines a number of jobs in each service class that are currently running on hypervisor 103A, e.g., x1 is the number of platinum jobs, x2 is the number of gold jobs, x3 is the number of silver jobs, and x4 is the number of bronze jobs. A queue of uncompleted tasks of different service classes on the hypervisor 103A is monitored to determine how many tasks are pending and their completion status (e.g., when a task enters the queue, what is the expected completion time of the task). For example, if the size of the data blocks to be compressed is L, and r is the compression speed if the CPU of hypervisor 103A is available exclusively, the costs c1 (platinum), c2 (gold), c3 (silver), and c4 (bronze) may be determined as described by EQs. 1-4:

$$c1 = L/(4r/(4x1+3x2+2x3+x4)) \qquad (EQ. 1);$$

$$c2 = L/(3r/(4x1+3x2+2x3+x4)) \qquad (EQ. 2);$$

$$c3 = L/(2r/(4x1+3x2+2x3+x4)) \quad \text{(EQ. 3); and}$$

$$c1 = L/(r/(4x1+3x2+2x3+x4)) \quad \text{(EQ. 4).}$$

Further, in block 304, the storage domain cost determination module 204C calculates of performing the service request for each device/service class pair in the computation domain 101, i.e., Hypervisor103A@Compute&Platinum; Hypervisor103A@Compute&Gold; Hypervisor103A@Compute&Silver; Hypervisor103A@Compute&Bronze, wherein the cost is an estimation of an amount of delay in performing the compression. In the storage domain 106, a central processing unit (CPU) resource allocation policy specifies that the CPU resources allocated for a bronze level job are one-third (⅓) the CPU resources allocated for a silver level job, and one-fifth (⅕) of the CPU resources allocated for gold level job. The storage domain cost determination module 204C determines a number of jobs in each service class that are currently running on storage controller 107A, e.g., $y_1$ is the number of gold jobs, $y_2$ is the number of silver jobs, and $y_3$ is the number of bronze jobs. A queue of uncompleted tasks of different service classes on the storage controller 107A is monitored to determine how many tasks are pending and their completion status (e.g., when a task enters the queue, what is the expected completion time of the task). For example, if the size of the data blocks to be compressed is L, and s is the compression speed if the CPU of storage contoller 107A is available exclusively, the costs $c_5$ (gold), $c_6$ (silver), and $c_7$ (bronze) may be determined as described by EQs. 5-7:

$$c_5 = L/(5s/(5y_1+3y_2+y_3)) \quad \text{(EQ. 5);}$$

$$c_6 = L/(3s/(5y_1+3y_2+y_3)) \quad \text{(EQ. 6); and}$$

$$c_7 = L/(s/(5y_1+3y_2+y_3)) \quad \text{(EQ. 7).}$$

Next, in block 305, the service request placement module 109/200 compares the estimated costs $c_1$, $c_2$, $c_3$, $c_4$, $c_5$, $c_6$, and $c_7$, and chooses a device and service class for performing the service request based on the estimated costs according to a predetermined criterion, e.g., minimum delay. Lastly, in block 306, the service request is performed by the selected device with the associated service class. In this example, the computation domain 101 and the storage domain 106 have different levels of service classes, different service-class-to-resource mappings, and domain-specific workload conditions. These cross-domain factors are used to make service placement and domain-specific service class assignment decisions. Such decisions are adaptive to SDE system changes. For example, if the storage controller is overwhelmed by extensive high priority input/output (I/O) workload, the service request placement module 109/200 may offload the compression service request to the computation domain 101. In another example, after a hardware upgrade of the storage controller 107A, the processing speed of storage controller 107A may be significantly improved. The service request placement module 109/200 will therefore push the compression service to the storage domain 106.

Figure 4:
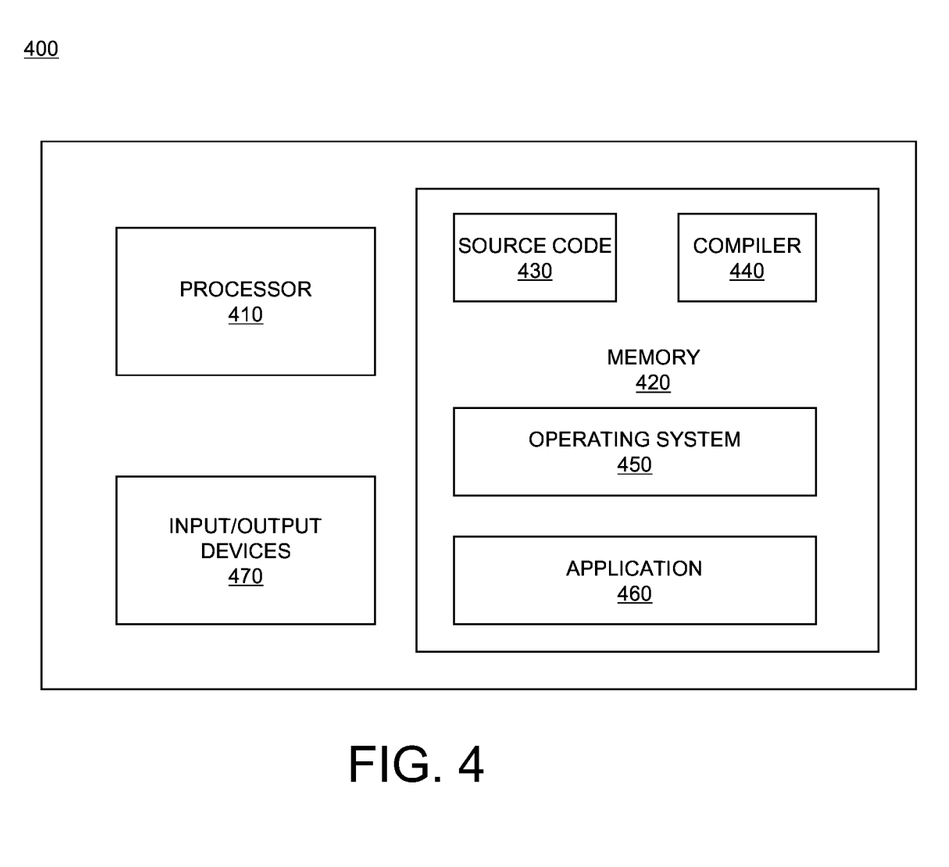
FIG. 4 depicts a computer system for use in conjunction with cross-domain service request placement in accordance with an embodiment.

FIG. 4 illustrates an example of a computer 400 which may be utilized by exemplary embodiments of cross-domain service request placement. Various operations discussed above may utilize the capabilities of the computer 400. One or more of the capabilities of the computer 400 may be incorporated in any element, module, application, and/or component discussed herein. For example, any of hypervisors 103A-B, networking devices 105A-D, and storage controllers 107A-B may comprise a computer such as computer 400.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include relatively efficient use of computing resources in a data center comprising an SDE.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for cross-domain service request placement in a software defined environment (SDE), the method comprising:
receiving, by a cross-domain service request placement module in an SDE controller, a service request corresponding to a job to be completed in the SDE, the SDE comprising a data center comprising a plurality of management and operation domains, each of the plurality of domains comprising a respective plurality of computer devices;
determining, by the cross-domain service request placement module, a first computer device in a first domain of the plurality of domains, and a second computer device in a second domain of the plurality of domains, that are capable of performing the service request;
determining, for the first computer device, a first plurality of available service classes, wherein the first plurality of available service classes is specific to the first domain;
determining, for the first computer device, a first plurality of costs of performing the service request, wherein each of the first plurality of costs corresponds to a single respective service class of the first plurality of service classes;
determining, for the second computer device, a second plurality of available service classes, wherein the second plurality of available service classes is specific to the second domain;
determining, for the second computer device, a second plurality of costs of performing the service request, wherein each of the second plurality of costs corresponds to a single respective service class of the second plurality of service classes;
selecting one of the first computer device and the second computer device to perform the service request based on the first and second plurality of costs; and
allocating a set of resources to each service class for both the first domain and the second domain; wherein the plurality of domains comprises a computation domain, a networking domain, and a storage domain, and wherein the SDE controller is in communication with each of the plurality of computer devices in the computation domain, the networking domain, and the storage domain.

2. The method of claim 1, wherein one of the first computer device and the second computer device, to perform the service request based on the first and second plurality of costs comprises selecting a cost of the first and second plurality of costs corresponding to a predetermined criterion for performing the service request, and wherein the service request is performed by the selected computer device at a service class corresponding to the selected cost.

3. The method of claim 2, wherein the predetermined criterion comprises a lowest amount of delay for completing the service request.

4. The method of claim 1, wherein the respective plurality of computer devices of the computation domain comprises a plurality of hypervisors or servers;
   wherein the respective plurality of computer devices of the networking domain comprises a plurality of routers or switches; and
   wherein the respective plurality of computer devices of the storage domain comprises a plurality of storage controllers.

5. The method of claim 4, wherein the service request is issued by a virtual machine that is hosted on one of the plurality of hypervisors.

6. The method of claim 1, wherein the first plurality of costs is determined based on historical load data and projected load data for the first computer device, and wherein the second plurality of costs is determined based on historical load data and projected load data for the second computer device.

7. The method of claim 1, wherein it is determined that the first and second computer devices are capable of performing the service request based on a specified minimum service level of the service request, a type of job corresponding to the service request, whether the first and second computer devices are trusted devices, and whether the first and second computer devices each have a built-in engine corresponding to the type of job.

8. The method of claim 1, wherein determining the first plurality of costs comprises:
   determining a number of jobs in each service class running on the first computing device;
   determining completion status of each job running on the first computing device; and
   using the allocated set of resources to determine the first plurality of costs.

9. The method of claim 1, wherein determining the second plurality of costs comprises:
   determining a number of jobs in each service class running on the second computing device;
   determining completion status of each job running on the second computing device; and
   using the allocated set of resources to determine the second plurality of costs.

10. A computer program product for implementing cross-domain service request placement in a software defined environment (SDE), the computer program product comprising:
   a non-transitory computer readable storage medium having program instructions embodied therewith, the program instructions readable by a processing circuit to cause the processing circuit to perform a method comprising:
   receiving a service request corresponding to a job to be completed in the SDE, the SDE comprising a data center comprising a plurality of management and operation domains, each of the plurality of domains comprising a respective plurality of computer devices;
   determining a first computer device in a first domain of the plurality of domains, and a second computer device in a second domain of the plurality of domains, that are capable of performing the service request;
   determining, for the first computer device, a first plurality of available service classes, wherein the first plurality of available service classes is specific to the first domain;
   determining, for the first computer device, a first plurality of costs of performing the service request, wherein each of the first plurality of costs corresponds to a single respective service class of the first plurality of service classes;
   determining, for the second computer device, a second plurality of available service classes, wherein the second plurality of available service classes is specific to the second domain;
   determining, for the second computer device, a second plurality of costs of performing the service request, wherein each of the second plurality of costs corresponds to a single respective service class of the second plurality of service classes;
   selecting one of the first computer device and the second computer device to perform the service request based on the first and second plurality of costs; and
   allocating a set of resources to each service class for both the first domain and the second domain; wherein
   the plurality of domains comprises a computation domain, a networking domain, and a storage domain, and wherein the SDE controller is in communication with each of the plurality of computer devices in the computation domain, the networking domain, and the storage domain.

11. The computer program product of claim 10, wherein one of the first computer device and the second computer device, to perform the service request based on the first and second plurality of costs comprises selecting a cost of the first and second plurality of costs corresponding to a predetermined criterion for performing the service request, and wherein the service request is performed by the selected computer device at a service class corresponding to the selected cost.

12. The computer program product of claim 11, wherein the predetermined criterion comprises a lowest amount of delay for completing the service request.

13. The computer program product of claim 10, wherein the plurality of domains comprises a computation domain, a networking domain, and a storage domain, and wherein the SDE controller is in communication with each of the plurality of computer devices in the computation domain, the networking domain, and the storage domain.

14. The computer program product of claim 13, wherein the respective plurality of computer devices of the computation domain comprises a plurality of hypervisors or servers;
   wherein the respective plurality of computer devices of the networking domain comprises a plurality of routers or switches; and wherein the respective plurality of computer devices of the storage domain comprises a plurality of storage controllers.

15. A computer system for cross-domain service request placement in a software defined environment (SDE), the system comprising:
a memory; and
a processor, communicatively coupled to said memory, the computer system configured to perform a method comprising:
receiving a service request corresponding to a job to be completed in the SDE, the SDE comprising a data center comprising a plurality of management and operation domains, each of the plurality of domains comprising a respective plurality of computer devices;
determining a first computer device in a first domain of the plurality of domains, and a second computer device in a second domain of the plurality of domains, that are capable of performing the service request;
determining, for the first computer device, a first plurality of available service classes, wherein the first plurality of available service classes is specific to the first domain;
determining, for the first computer device, a first plurality of costs of performing the service request, wherein each of the first plurality of costs corresponds to a single respective service class of the first plurality of service classes;
determining, for the second computer device, a second plurality of available service classes, wherein the second plurality of available service classes is specific to the second domain;
determining, for the second computer device, a second plurality of costs of performing the service request, wherein each of the second plurality of costs corresponds to a single respective service class of the second plurality of service classes;
selecting one of the first computer device and the second computer device to perform the service request based on the first and second plurality of costs; and
allocating a set of resources to each service class for both the first domain and the second domain; wherein
the plurality of domains comprises a computation domain, a networking domain, and a storage domain, and wherein the SDE controller is in communication with each of the plurality of computer devices in the computation domain, the networking domain, and the storage domain.

16. The system of claim 15, wherein one of the first computer device and the second computer device, to perform the service request based on the first and second plurality of costs comprises selecting a cost of the first and second plurality of costs corresponding to a predetermined criterion for performing the service request, and wherein the service request is performed by the selected computer device at a service class corresponding to the selected cost.

17. The system of claim 16, wherein the predetermined criterion comprises a lowest amount of delay for completing the service request.

18. The system of claim 15, wherein the plurality of domains comprises a computation domain, a networking domain, and a storage domain, and wherein the SDE controller is in communication with each of the plurality of computer devices in the computation domain, the networking domain, and the storage domain.

19. The system of claim 18, wherein the respective plurality of computer devices of the computation domain comprises a plurality of hypervisors or servers;
wherein the respective plurality of computer devices of the networking domain comprises a plurality of routers or switches; and
wherein the respective plurality of computer devices of the storage domain comprises a plurality of storage controllers.

* * * * *